(12) United States Patent  
Jung

(10) Patent No.: US 8,387,214 B2
(45) Date of Patent: Mar. 5, 2013

(54) HIDDEN TYPE HOOD GAS LIFTER DEVICE

(75) Inventor: In Su Jung, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 77 days.

(21) Appl. No.: 12/500,394

(22) Filed: Jul. 9, 2009

(65) Prior Publication Data

US 2010/0132160 A1    Jun. 3, 2010

(30) Foreign Application Priority Data

Dec. 1, 2008    (KR) .................. 10-2008-0120765

(51) Int. Cl.
*E05D 7/00* (2006.01)

(52) U.S. Cl. ......................................... 16/354

(58) Field of Classification Search ............... 296/146.4, 296/146.8, 56, 76, 193.11; 180/69.2, 69.21; 49/339–342
See application file for complete search history.

(56) References Cited

U.S. PATENT DOCUMENTS

| 6,676,190 | B2* | 1/2004 | Daniels et al. | 296/106 |
| 6,789,834 | B2* | 9/2004 | Schlegel | 296/76 |
| 6,955,390 | B2* | 10/2005 | Rigorth et al. | 296/146.4 |
| 7,267,390 | B2* | 9/2007 | Kuan et al. | 296/146.8 |
| 7,357,437 | B2* | 4/2008 | Kuhr | 296/76 |
| 2002/0038963 | A1* | 4/2002 | Moon | 296/146.8 |
| 2002/0180233 | A1* | 12/2002 | Benthaus et al. | 296/76 |
| 2004/0108317 | A1* | 6/2004 | Buckner | 220/263 |
| 2004/0205934 | A1* | 10/2004 | Derbis et al. | 16/289 |
| 2006/0051160 | A1* | 3/2006 | Sun et al. | 403/122 |
| 2006/0071504 | A1 | 4/2006 | Ishihara et al. | |
| 2006/0086551 | A1* | 4/2006 | Cleland et al. | 180/69.2 |

FOREIGN PATENT DOCUMENTS

| EP | 0 808 982 A2 | 11/1997 |
| JP | 2000-203377 A | 7/2000 |
| JP | 2006-104789 A | 4/2006 |
| KR | 1992-0003885 Y1 | 6/1992 |
| KR | 10-2007-0051484 A | 5/2007 |

* cited by examiner

*Primary Examiner* — Victor Batson
*Assistant Examiner* — Matthew Sullivan
(74) *Attorney, Agent, or Firm* — Morgan, Lewis & Bockius LLP

(57) ABSTRACT

A hidden type hood gas lifter device may include a gas lifter, a hood hinge arm having one end portion fixed to a hood, a hinge bracket having one end portion fixed to a vehicle body, wherein the other end portion of the hood hinge arm is rotatably coupled to the other end portion of the hinge bracket, and a gear unit coupling the other end portion of the hood hinge arm and one end portion of the gas lifter.

12 Claims, 9 Drawing Sheets

HIDDEN TYPE HOOD GAS LIFTER DEVICE

CROSS-REFERENCE TO RELATED APPLICATION

The present application claims priority to Korean Patent Application Number 10-2008-120765, filed on Dec. 1, 2008, the entire contents of which application is incorporated herein for all purpose by this reference.

BACKGROUND OF THE INVENTION

1. Field of the Invention

The present invention relates to a hidden type hood gas lifter device, and more particularly, to a hidden type hood gas lifter device, which can make a gas lifter installed in a narrow space of a lower portion of a fender panel and improve maintenance in an engine compartment and degree of freedom on layout by making an operation force of the gas lifter transferred to a hood hinge through a gear portion installed between connecting links.

2. Description of Related Art

Presently, in some high-class vehicles, a hidden type hood gas lifter device has been introduced to protect pedestrians and to secure maintenance in an engine compartment.

FIG. 1A is a perspective view illustrating an example of a conventional hidden type hood gas lifter device mounted on a vehicle, and FIG. 1B is a detail view of the hidden type hood gas lifter device illustrated in FIG. 1A.

As illustrated in FIGS. 1A and 1B, the conventional hidden type hood gas lifter device includes a gas lifter 10 reciprocating in forward and backward directions by gas pressure, and a hood hinge portion 30 connected to the gas lifter 10 by a bracket 20 to guide opening and closing of a hood through a hinge arm 34 via a series of connecting links 31, 32, and 33.

In the above described structure, the gas lifter 10 is installed inside a movement space (i.e. space A in FIG. 1A) which is secured in a lower portion of a fender panel (not illustrated) positioned on the side of the hood. Accordingly, the gas lifter 10 is not exposed to an inside of an engine compartment space positioned in a lower portion of the hood, and freely moves within the movement space A.

The conventional hidden type hood hinge structure as described above changes the direction of the gas lifter through a typical four-bar link, and transfers a simple operating force to open/close the hood.

In the four-bar link hood hinge structure as illustrated in FIG. 1B, the operating direction of the respective connecting links should be opposite to the operating direction of the connecting link hinge portion, and thus it is difficult to select the layout of the gas lifter 10 and the connecting links 31, 32, and 33 connected to the gas lifter 10.

Also, since the operation of the hood hinge structure is limited to the simple force transfer and the change of the force transfer types (e.g. rotating force ☐ output ☐ rotating force), it is difficult to select the whole layout and to increase the moment.

In addition, since the components constituting the hood hinge structure are manufactured by casting, it is difficult to manufacture them, and the manufacturing cost becomes high.

On the other hand, most hood gas lifter devices mounted on vehicles are open type gas lifter devices in which the gas lifter 10 is provided in a position B that is inside the engine compartment in a lower portion of the hood 40 as illustrated in FIG. 2.

In the case of the open type gas lifter device as described above, however, it becomes difficult to secure the maintenance in the engine compartment when the hood 40 is open, the degree of freedom on the layout in the engine compartment deteriorates, and the protection of pedestrians becomes weakened.

In order to apply the hidden type hood gas lifter device to a general vehicle to overcome the above described drawbacks, it is required to sufficiently secure a space for the moving distance of the gas lifter in the lower portion of the fender panel from the viewpoint of the vehicle layout. However, since wirings or other collision members are mostly positioned in the corresponding part, the space for the moving distance of the gas lifter cannot be secured, and thus it is impossible to install the gas lifter therein.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a hidden type hood gas lifter device, which can make an open angle of a hood large in comparison to a moving distance of a gas lifter and thus can make the gas lifter installed even in a narrow space by making an operation force of the gas lifter transferred through a pair of spur gears installed between connecting links.

In an aspect of the present invention, the hidden type hood gas lifter device may include a gas lifter, a hood hinge arm having one end portion fixed to a hood, a hinge bracket having one end portion fixed to a vehicle body, wherein the other end portion of the hood hinge arm is rotatably coupled to the other end portion of the hinge bracket, and a gear unit coupling the other end portion of the hood hinge arm and one end portion of the gas lifter.

The gear unit may include a first connecting link, one end portion of which is connected to the other end portion of the hood hinge arm, a link member, one end portion of which is rotatably coupled to the one end portion of the gas lifter, and a gear portion coupling the other end portion of the first connecting link and the other end portion of the link member.

The gear portion may include a first spur gear fixed to the other end portion of the link member, a second spur gear fixed to the other end portion of the first connecting link and meshed with the first spur gear, and a guide member connecting rotational axes of the first and second spur gears, wherein the tooth numbers of the first and second spur gears are different.

The hidden type hood gas lifter device may further include a second connecting link, one end portion of which is fixed to the one end portion of the link member and the other end portion of which is rotatably connected to the one end portion of the gas lifter, wherein a ball joint is installed inside a coupling part where the gas lifter and the second connecting link are connected together, and wherein the first and second connecting links have different length each other.

In further another aspect of the present invention, the hidden type hood gas lifter device may include a second connecting link, one end portion of which is rotatably coupled to the one end portion of the link member and the other end portion of which is fixed to the one end portion of the gas lifter, wherein the first and second connecting links have different length each other.

In still further another aspect of the present invention, the gear unit may include a link member, and a gear portion coupling one end portion of the link member and the one end portion of the gas lifter, wherein the other end portion of the link member is fixed to the other end portion of the hood hinge arm, wherein the gear portion includes, a first spur gear connected to the one end portion of the gas lifter, a second spur gear connected to the one end portion of the link member and meshed with the first spur gear, and a guide member connecting rotational axes of the first and second spur gears, wherein the tooth numbers of the first and second spur gears are different.

The hidden type hood gas lifter device may further include a second connecting link, one end portion of which is fixed to the first spur gear and the other end portion of which is fixed to the one end portion of the gas lifter and a first connecting link connecting the other end portion of the hood hinge arm and the other end portion of the link member, wherein the first and second connecting links have different length each other.

The gas lifter may be installed in a lower portion of a fender panel positioned on a side of the hood so that the gas lifter is not exposed to the inside of the engine compartment in a lower portion of the hood.

In another aspect of the present invention, the hidden type hood gas lifter device may include a gas lifter, a first connecting link having one end rotatably connected to the gas lifter, a link member having a lower end connected to the other end of the first connecting link, a gear portion fixed to an upper end of the link member, a second connecting link having one end connected to the gear portion to rotate, a hinge bracket pivotally supporting the other end of the second connecting link, and a hood hinge arm having one end fixed to the other end of the second connecting link and the other end connected to a hood, wherein the gear portion includes, a first spur gear coupled to the upper end of the link member, a second spur gear tooth-engaged with the first spur gear, and a guide member supporting the first spur gear and the second spur gear, and wherein the first and second connecting links have different length each other and/or the tooth numbers of the first and second spur gears are different.

According to the hidden type hood gas lifter device as constructed above according to the present invention, the gas lifter can be installed even in a narrow movement space of the lower portion of the fender panel, and the length of the links can be easily manipulated to facilitate the manipulation of the moment.

Also, since the force of the gas lifter is transferred by the rotation of the gear and the moving range of the gas lifter becomes small, the gas pressure of the gas lifter can be easily adjusted, and the opening speed of the hood and the hood opening/closing manipulation force can be greatly improved by manipulation of the rotating ratio of the spur gears.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
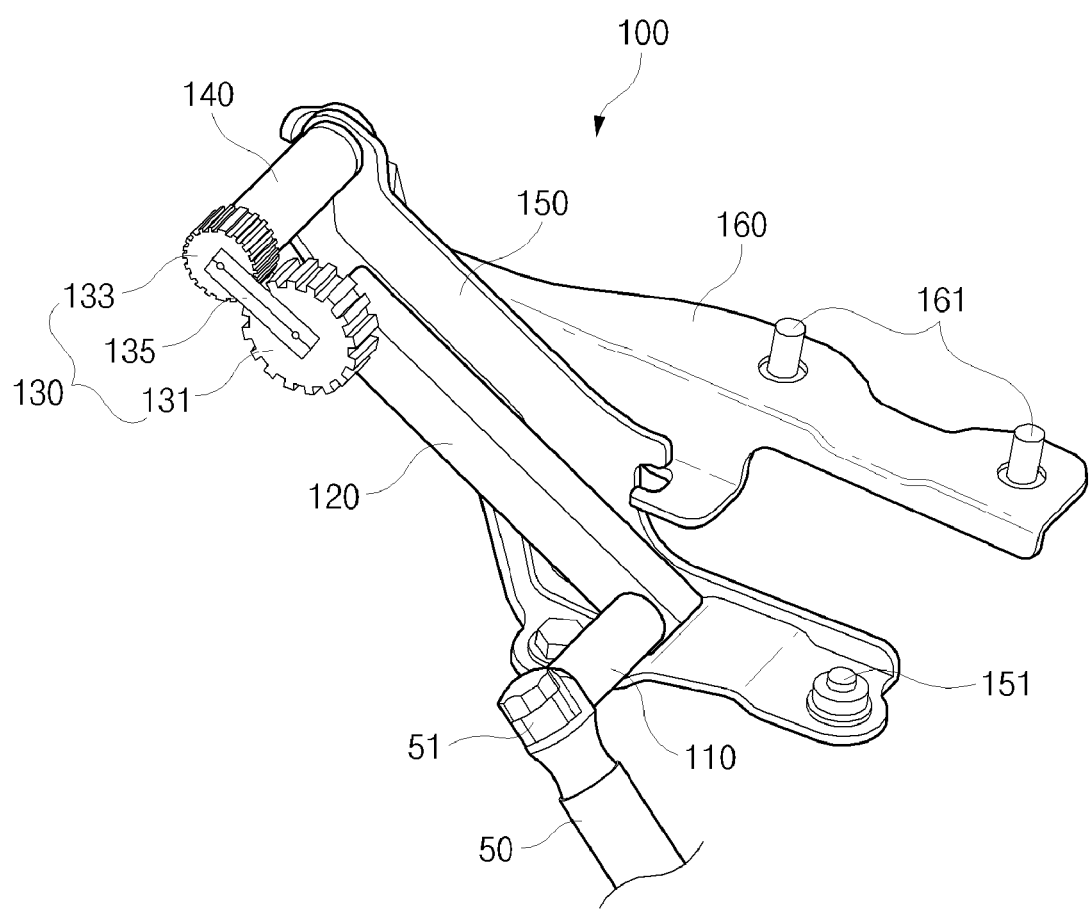
FIG. 3 is a perspective view illustrating the structure of an exemplary hidden type hood gas lifter device according to the present invention.
Figure 4A:
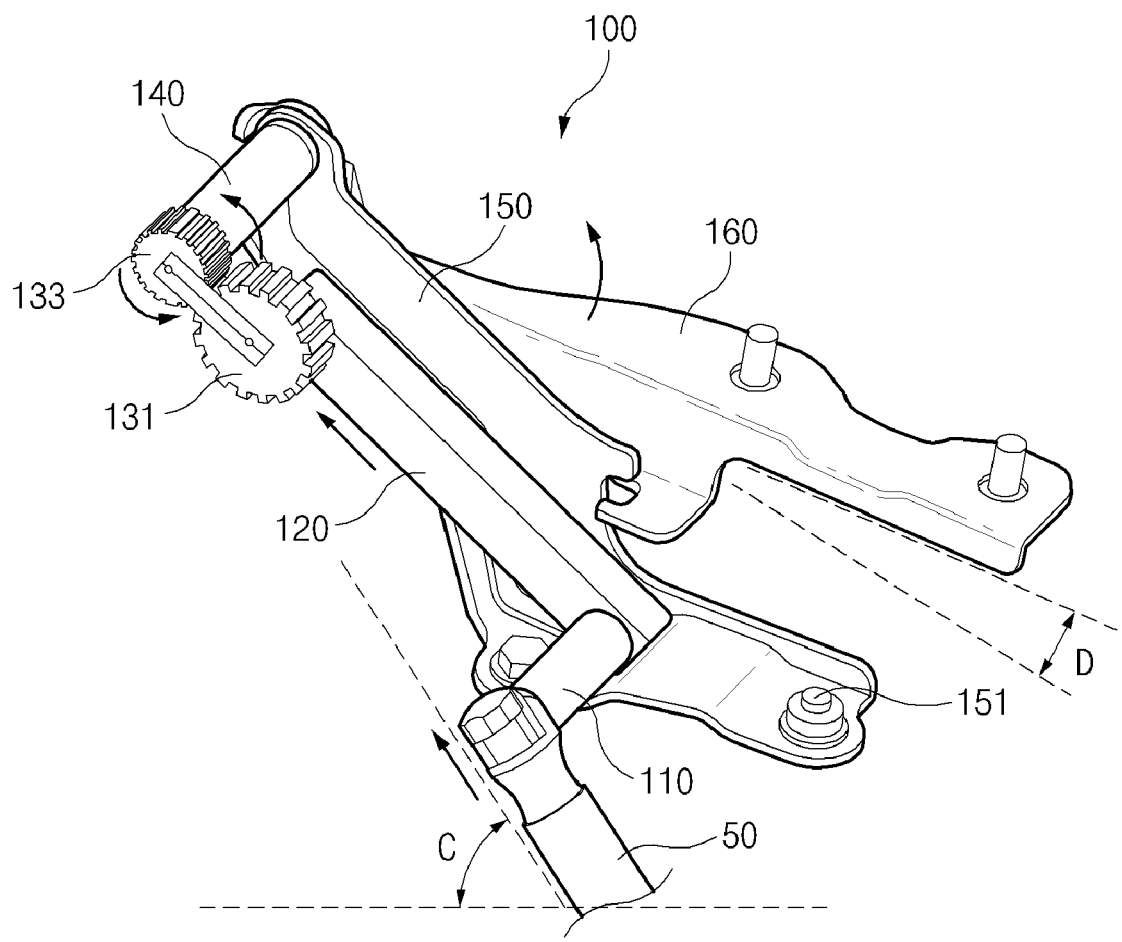
FIGS. 4A and 4B are perspective views illustrating an operation state of an exemplary hidden type hood gas lifter device according to the present invention.
Figure 4B:
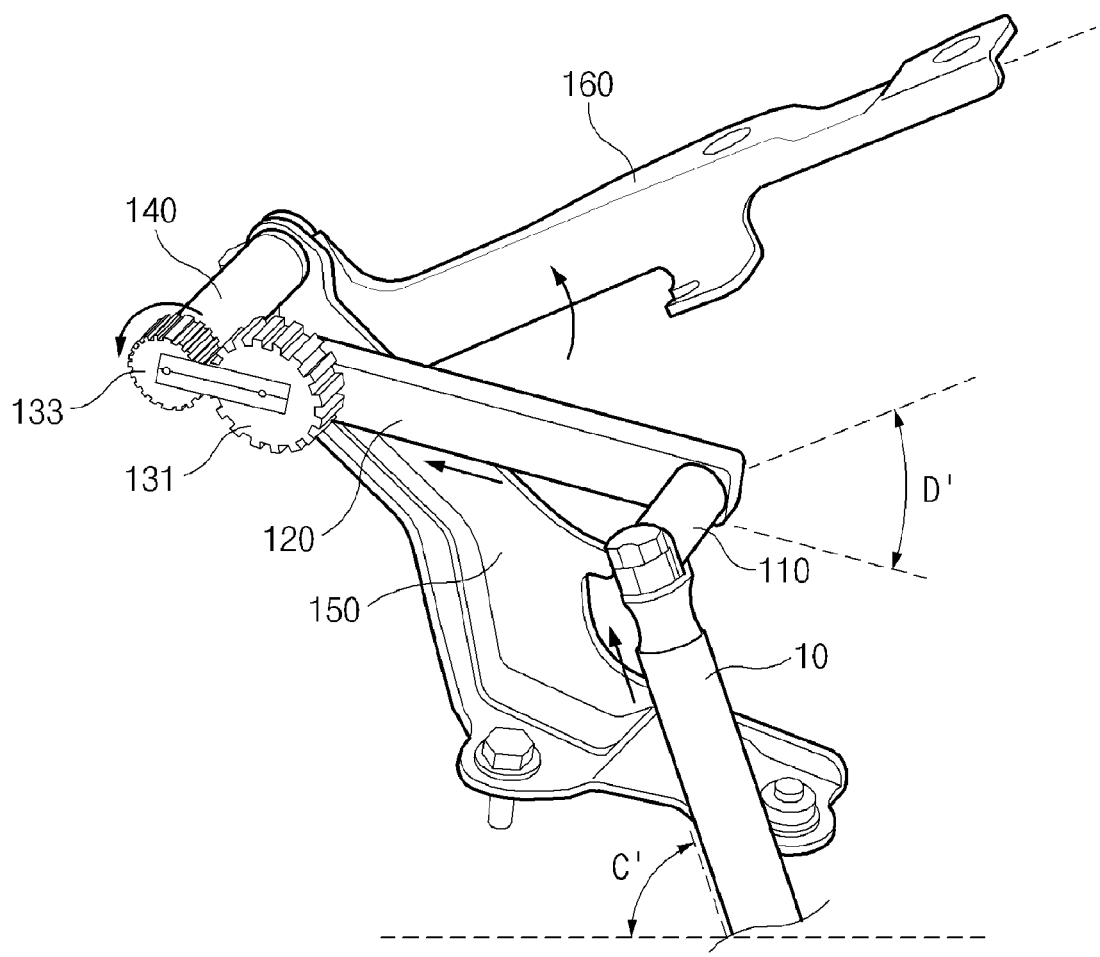

FIG. 3 is a perspective view illustrating the structure of a hidden type hood gas lifter device according to various embodiments of the present invention, and FIGS. 4A and 4B are perspective views illustrating an operation state of a hidden type hood gas lifter device according to various embodiments of the present invention.

Figure 1A:
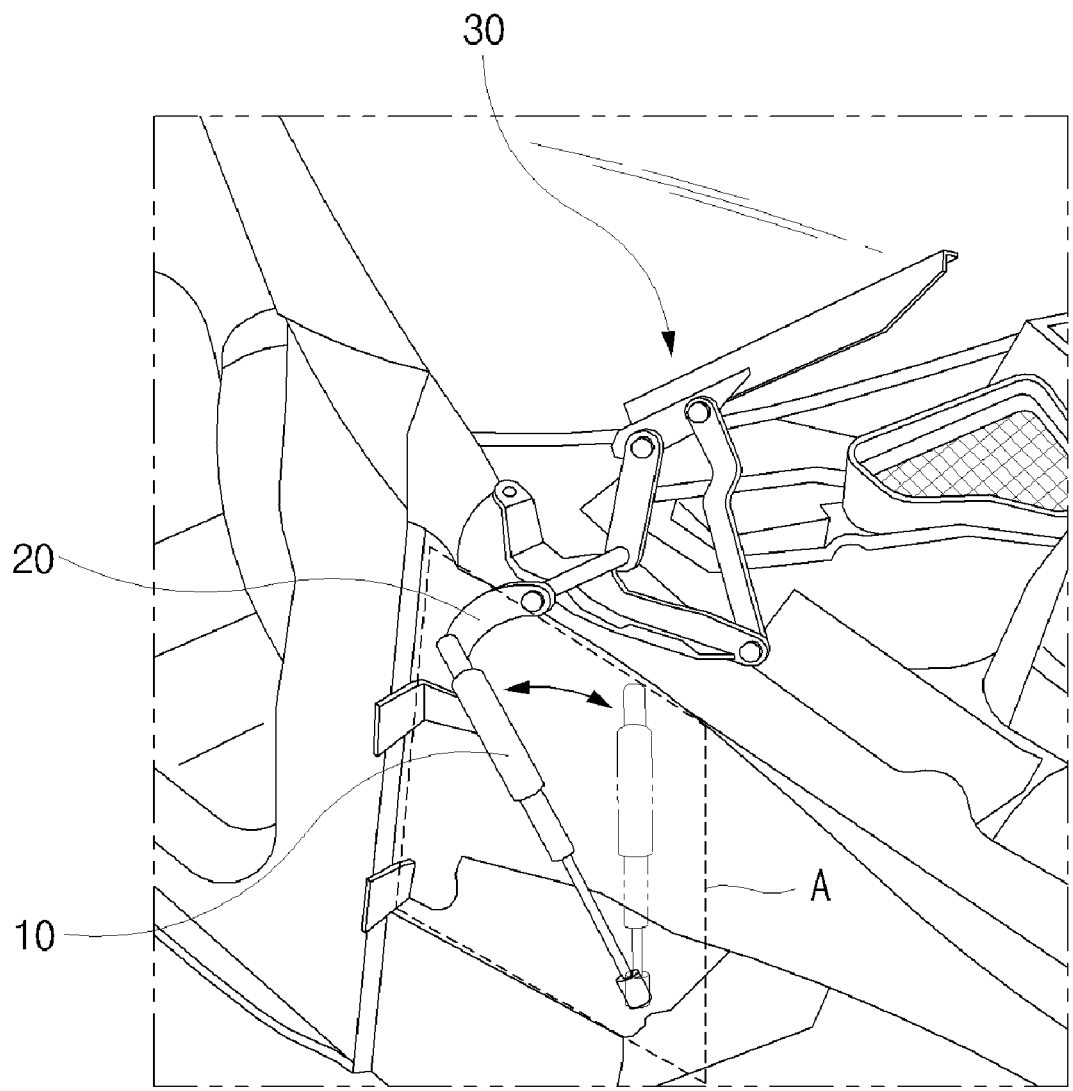
FIGS. 1A and 1B are perspective views illustrating an example of a conventional hidden type hood gas lifter device.
Figure 1B:
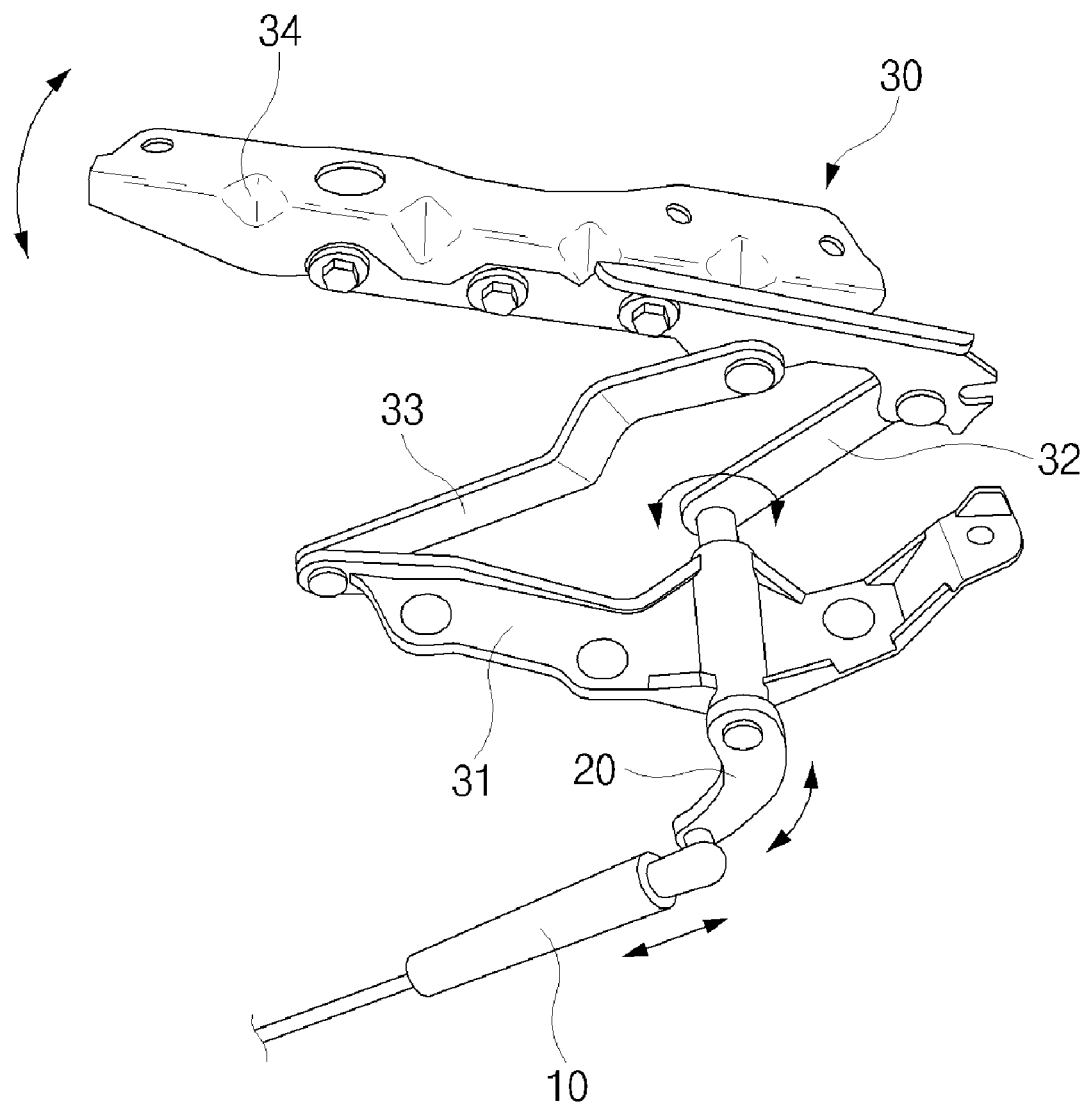
Figure 2:
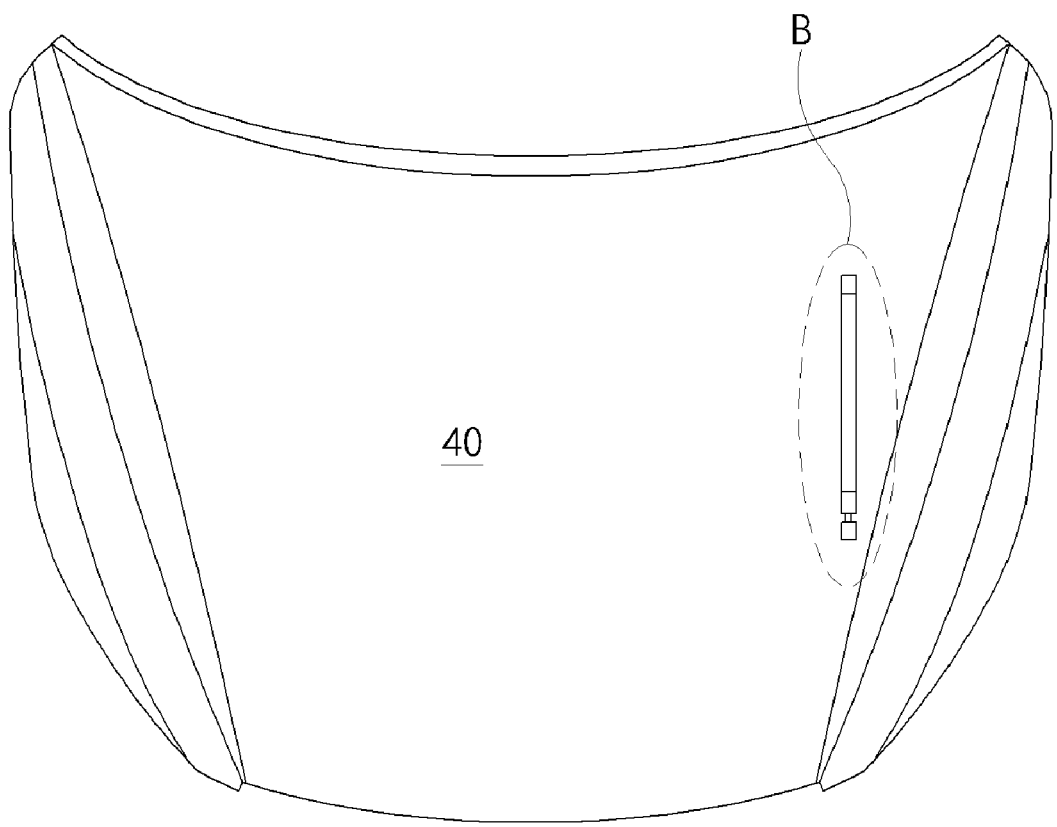
FIG. 2 is a view illustrating an installation position of a conventional hood gas lifter device.

In a hidden type hood gas lifter device 100 according to various embodiments of the present invention, a gas lifter 50, which moves in forward and backward directions by gas pressure, is installed in a lower portion of a fender panel positioned on a side of a hood, so that the gas lifter 50 is not exposed to the inside of an engine compartment in a lower portion of the hood (See FIG. 1A).

In this case, the gas lifter 50 requires only a small movement space in accordance with the operating characteristic of the gas lifter device 100.

The whole construction of the gas lifter device 100 according to various embodiments of the present invention, which is connected to the gas lifter 50, will now be described.

The gas lifter device 100 according to various embodiments of the present invention includes a first connecting link 110 having one end rotatably connected to the gas lifter 50, a link member 120 having a lower end portion connected to the other end portion of the first connecting link 110, a gear portion 130 installed at an upper end portion of the link member 120, a connecting link 140 having one end fixed to the gear portion 130, a hinge bracket 150 pivotally supporting the other end portion of the connecting link 140, and a hood hinge arm 160 having one end fixed to the other end portion of the connecting link 140 and the other end portion connected to a hood, and rotating upward and downward by the rotation of the second connecting link 140.

In the construction of the hidden type hood gas lifter device 100 according to various embodiments of the present invention, a ball joint is mounted on the inside of an upper end portion 51 of the gas lifter 50 coupled to one end of the first connecting link 110, and thus connected to one end of the first connecting link 110.

Accordingly, if the gas lifter 50 moves upward and downward by the gas pressure, the first connecting link 110 having one end connected to the front end portion of the gas lifter 50 is rotated.

The link member 120 having the lower end portion fixed in a body to the first connecting link 110 moves when the first connecting link 110 moves, and gears in the gear portion 130 mounted on the front end portion of the link member 120 are rotated.

The gear portion 130 includes a first spur gear 131 coupled in a body to the upper end portion of the link member 120, a second spur gear 133 tooth-engaged with the first spur gear 131 that is opposite to the first spur gear, and a guide member 135 rotatably supporting the first spur gear 131 and the second spur gear 133.

The rotation of the first spur gear 131 causes the second spur gear 133 that is tooth-engaged with the first spur gear 133 to be rotated, and the rotation of the second spur gear 133 leads the connecting link 140 that is connected in a body with the second spur gear 133 to be rotated. The connecting link 140 has the other end portion pivotally supported by the front end portion of the hinge bracket 150, and rotates the hood hinge arm 160 which has one end connected to the other end portion of the second connecting link 40 that extends to an outside of a pivot support portion of the hinge bracket 150.

To the other end portion of the hood hinge arm 160, a hood is fixed by a separate mounting member 161, and the hinge bracket 150 is fixed to a vehicle body by a mounting member 151.

On the other hand, when a pair of spur gears 131 and 133, which are engaged with each other, is rotated, noise sound is generated from the engaged portion. In order to prevent this, ends of gear teeth may be coated with synthetic resin such as PVC.

According to the hidden type hood gas lifter device 100 as constructed above according to various embodiments of the present invention, the operating force of the gas lifter 50 is transferred to the spur gears 131 and 133 through the first connecting link 110 and the link member 120, and the rotating force through the spur gears 131 and 133 is transferred to the hood hinge arm 160 through the connecting link 140 and the pivot portion of the hinge bracket 150, so that the hood is opened or closed through the hood hinge arm 160.

Hereinafter, the operation state of the hidden type hood gas lifter device in accordance with the opening/closing of the hood according to various embodiments of the present invention will be described.

FIGS. 4A and 4B are perspective views illustrating an operation state of a hidden type hood gas lifter device according to various embodiments of the present invention. FIG. 4A illustrates the vehicle hood in a closed state, and FIG. 4B illustrates the vehicle hood in an open state.

In the case where the vehicle hood is closed as illustrated in FIG. 4A, the gas lifter 50 is moved downward. In this state, the inclination angle formed by the gas lifter 50 against a horizontal surface is indicated by C, and the inclination angle formed by the hood hinge arm 160 against a reference surface is indicated by D. In this instance, the reference surface is a reference line of an initial position before the hood hinge arm 160 is moved.

In the case where the vehicle hood is open as illustrated in FIG. 4B, the gas lifter 50 is drawn upward to lift the first connecting link 110 and the link member 120 upward. In this instance, the angle formed by the gas lifter 50 lifted upward against the horizontal surface is indicated by C', and the angle formed by the ascending hood hinge arm 160 is indicated by D'.

In detail, as shown in FIG. 4A, when a gas lifter 50 is extended to move, a link member 120 moves together with the gas lifter 50, a first gear 131 of a gear portion 130 moves together with the link member 120, and the movement of the first gear 131 pushes a second gear 133 and thereby the second gear 133 rotates in a counter-clockwise direction.

Also, as shown in FIG. 4B, a connecting link 140 rotates in a counter-clockwise direction along with the second gear to rotate the hood hinge arm 160 in a top direction.

Accordingly, the opening angle of the gas lifter 50 becomes (C'-C), and the opening angle of the hood hinge arm 160 becomes (D'-D). The opening angle (C'-C) of the gas lifter 50 and the opening angle (D'-D) of the hood hinge arm 160 are changed in proportion to the rotating ratio of the pair of spur gears 131 and 133. That is, even if the displacement by the gas lifter 50 is small, the opening angle of the hood hinge arm 160 can be enlarged in proportion to the rotating ratio of the spur gears 131 and 133.

On the other hand, according to the hidden type hood gas lifter device 100 according to various embodiments of the present invention, the opening/closing degree of the hood can be adjusted through the installation position of the spur gears 131 and 133, the gear ratio manipulation of the spur gears 131 and 133, the length manipulation of the connecting links 110 and 140, and the like, and the layout can be secured in the engine compartment.

Figure 5A:
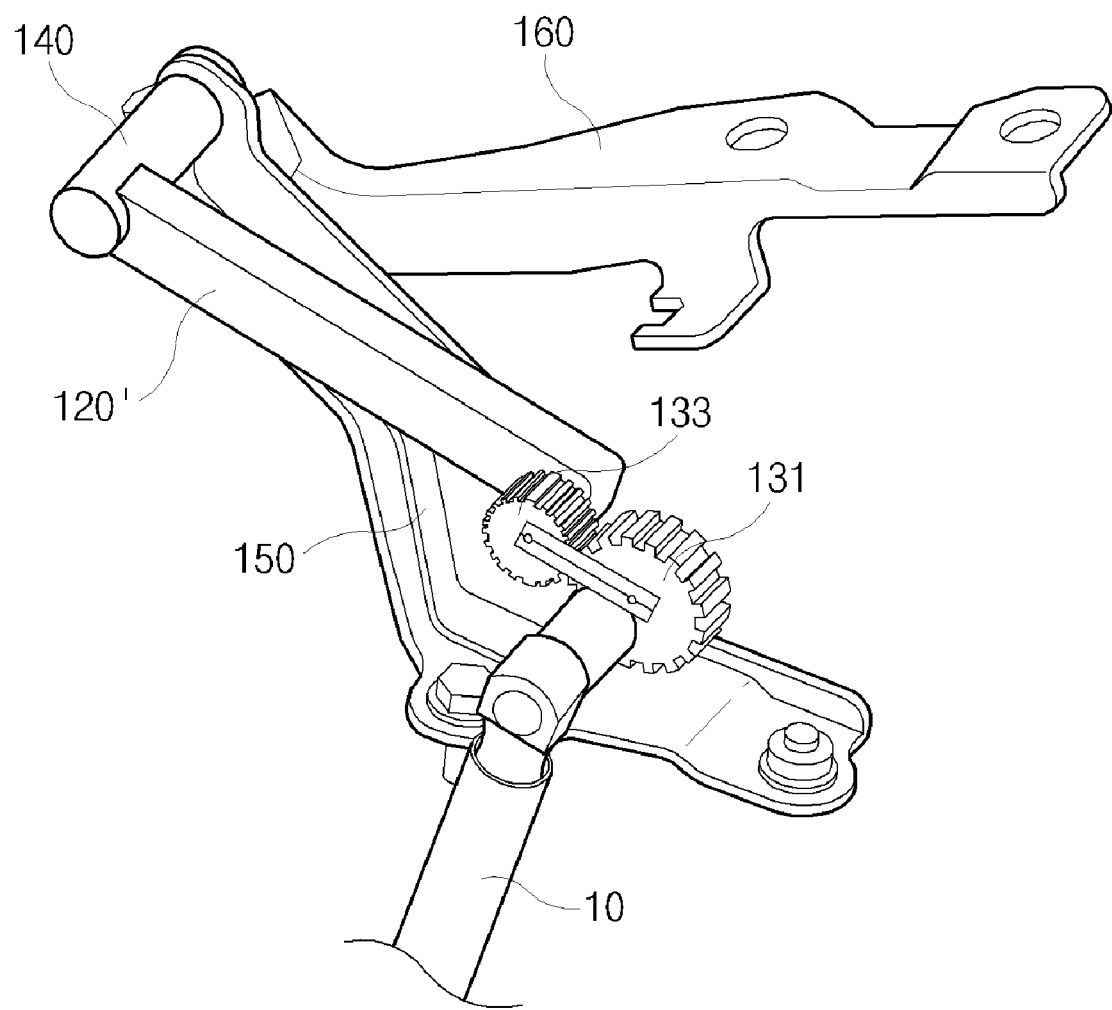
FIGS. 5A to 5C are perspective views illustrating an exemplary hidden type hood gas lifter device according to the present invention.
Figure 5B:
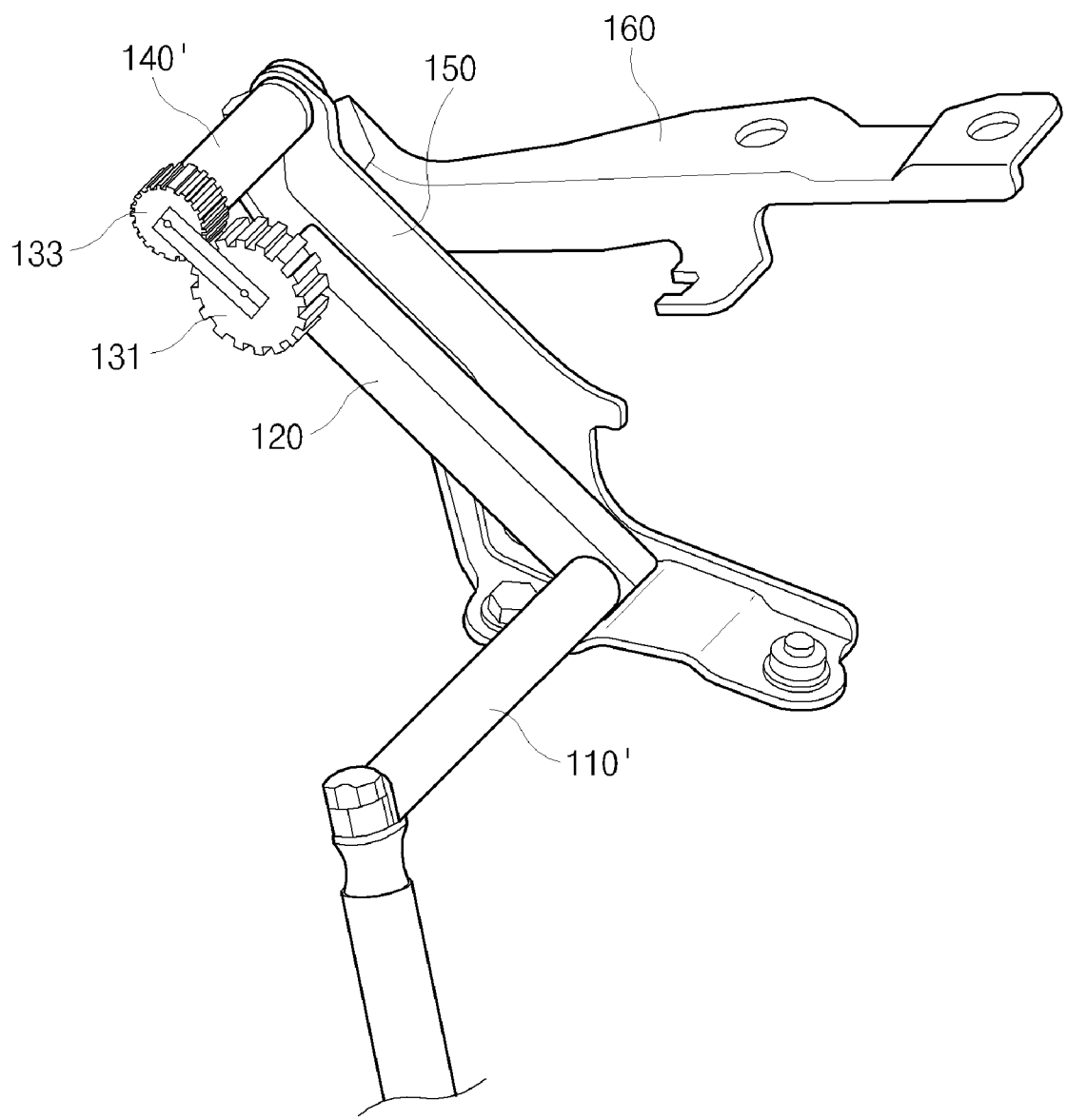
Figure 5C:
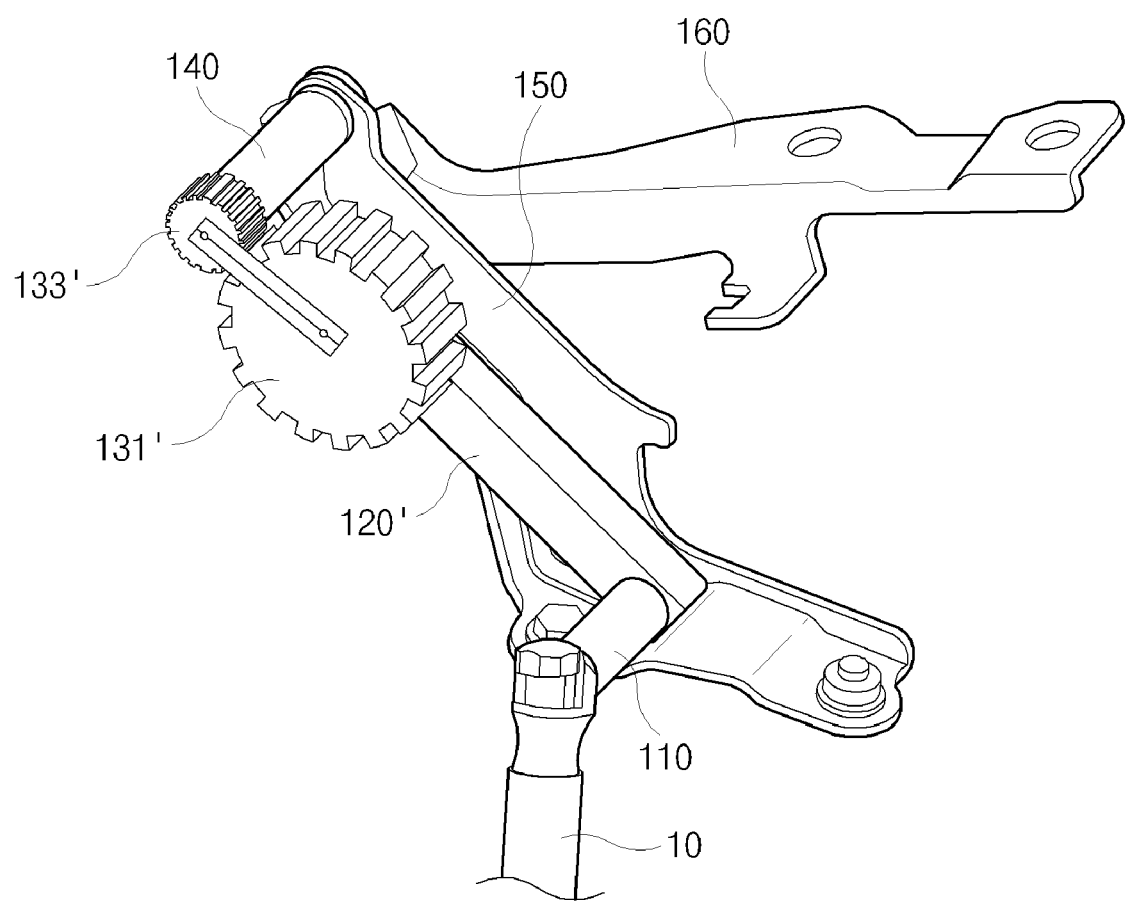

FIGS. 5A to 5C are perspective views illustrating another example of a hidden type hood gas lifter device according to various embodiments of the present invention.

FIG. 5A illustrates a case where the positions of the spur gears 131 and 133 have been changed. In this case, the first spur gear 131 is positioned at the rear end of the link member 120, and the shape of the link member 120' is changed to facilitate the change of the layout.

FIG. 5B illustrates a case where the lengths of the connecting links 110 and 140 have been changed in a state that the positions of the spur gears 131 and 133 are fixed. In this case, the first connecting link 110' and the connecting link 140' have been lengthened. Accordingly, it is easy to change the layout and to perform the tuning of the gas pressure of the gas lifter device through securing of the transfer moment.

FIG. 5C illustrates a case where the number of gear teeth of the spur gears has been manipulated. In this case, the diameter of the first spur gear 131' is large and the diameter of the second spur gear 133' is small to adjust the gear rotation ratio. Accordingly, it is advantageous in adjustment of the displacement of the hood hinge arm 160.

As described above, according to various embodiments of the present invention, the opening angle of the hood hinge arm can be enlarged in comparison to the moving distance of the gas lifter, and thus the gas lifter can be installed even in a narrow space.

Also, since the gas lifter can be installed even in a narrow space, the length of the connecting links can be easily manipulated to facilitate the moment manipulation that is in proportion to the force and the distance.

In addition, as the moving range of the gas lifter becomes small, the gas pressure of the gas lifter can be easily adjusted, and the opening speed of the hood and the hood opening/closing manipulation force can be easily controlled by manipulation of the rotating ratio of the spur gears.

For convenience in explanation and accurate definition in the appended claims, the terms "upper", "lower", and "inside" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gas-lifter device for a vehicle hood, the device comprising:
   a hood hinge arm affixed to the vehicle hood;
   a hinge bracket for pivotally mounting the hood hinge arm and the vehicle hood to a vehicle body;
   a hinge-arm spur gear affixed relative to the hinge arm, wherein the hinge-arm spur gear moves with the hinge arm to rotate with respect to the hinge bracket;
   a link-member spur gear intermeshed with the hinge-arm spur gear;
   a guide member rotatably supporting the link-member spur gear to orbit about the hinge-arm spur gear;
   a link member having an upper end affixed to the link-member spur gear and a lower end operably connected to a gas lifter.

2. The gas-lifter device of claim 1, wherein the device further comprises a first connecting link having one end thereof rotatably connected to the gas lifter and another end affixed to the lower end of the link member.

3. The gas-lifter device of claim 2, wherein the device further comprises a ball joint interconnecting the gas lifter and said one end of the first connecting link.

4. The gas-lifter device of claim 2, wherein the device further comprises a second connecting link having one end thereof affixed to the hinge-arm spur gear and another end thereof affixed to the hinge arm to rotate with the hinge arm.

5. The gas-lifter device of claim 3, wherein the first and second connecting links have different lengths.

6. The gas-lifter device of claim 1, wherein the hinge-arm spur gear and the link-member spur gear have different tooth numbers.

7. The gas-lifter device of claim 1, wherein the hinge-arm spur gear has a smaller diameter than that of the link-member spur gear.

8. The gas-lifter device of claim 1, wherein the gas lifter is installed in a lower portion of a fender panel positioned to one side of the vehicle hood so that the gas lifter is not exposed to the engine compartment enclosed by the vehicle hood.

9. A gas-lifter device for a vehicle hood, the device comprising:
   a hood hinge arm for supporting the vehicle hood;
   a hinge bracket for pivotally mounting the hood hinge arm and the vehicle hood to a vehicle body;
   a hinge-arm spur gear affixed relative to the hood hinge arm, wherein the hinge-arm spur gear moves with the hinge arm to rotate with respect to the hinge bracket;
   a gas-lifter spur gear intermeshed with the hinge-arm spur gear;
   a guide member rotatably supporting the gas-lifter spur gear to orbit about the hinge-arm spur gear;
   a gas lifter having an upper end operably connected to the gas-lifter spur gear.

10. The gas-lifter device of claim 9, wherein the hinge-arm spur gear and the link-member spur gear have different tooth numbers.

11. The gas-lifter device of claim 9, wherein the hinge-arm spur gear has a smaller diameter than that of the link-member spur gear.

12. The gas-lifter device of claim 9, wherein the gas lifter is installed in a lower portion of a fender panel positioned to one side of the vehicle hood so that the gas lifter is not exposed to the engine compartment enclosed by the vehicle hood.

* * * * *